June 14, 1932.    F. A. TOWNSLEY    1,862,989
SAFETY APPLIANCE FOR AIRCRAFT
Original Filed April 10, 1929    4 Sheets-Sheet 1

INVENTOR.
Frederick A. Townsley.
BY
ATTORNEY.

June 14, 1932.　　F. A. TOWNSLEY　　1,862,989
SAFETY APPLIANCE FOR AIRCRAFT
Original Filed April 10, 1929　　4 Sheets-Sheet 2
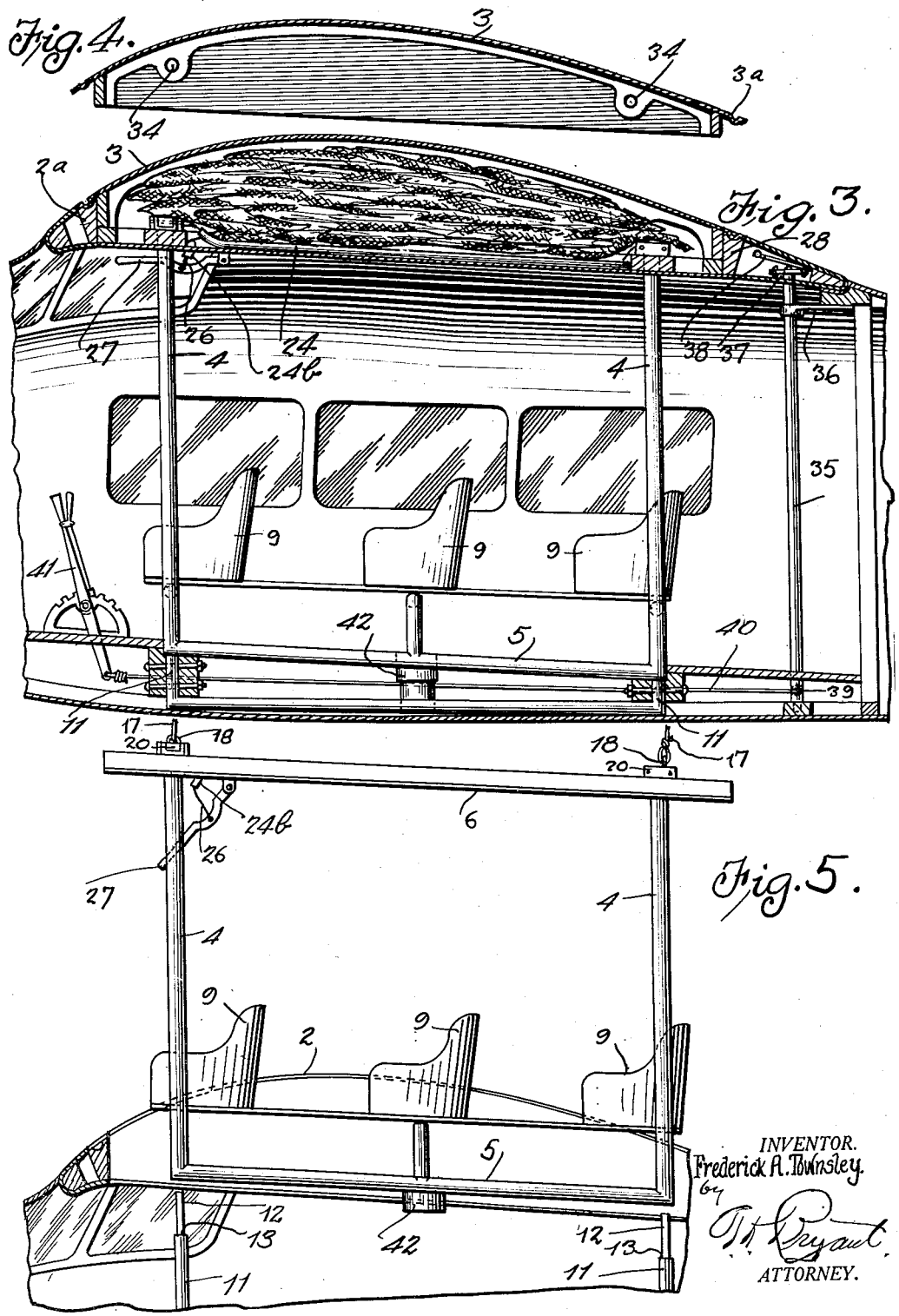
INVENTOR.
Frederick A. Townsley.
by
ATTORNEY.

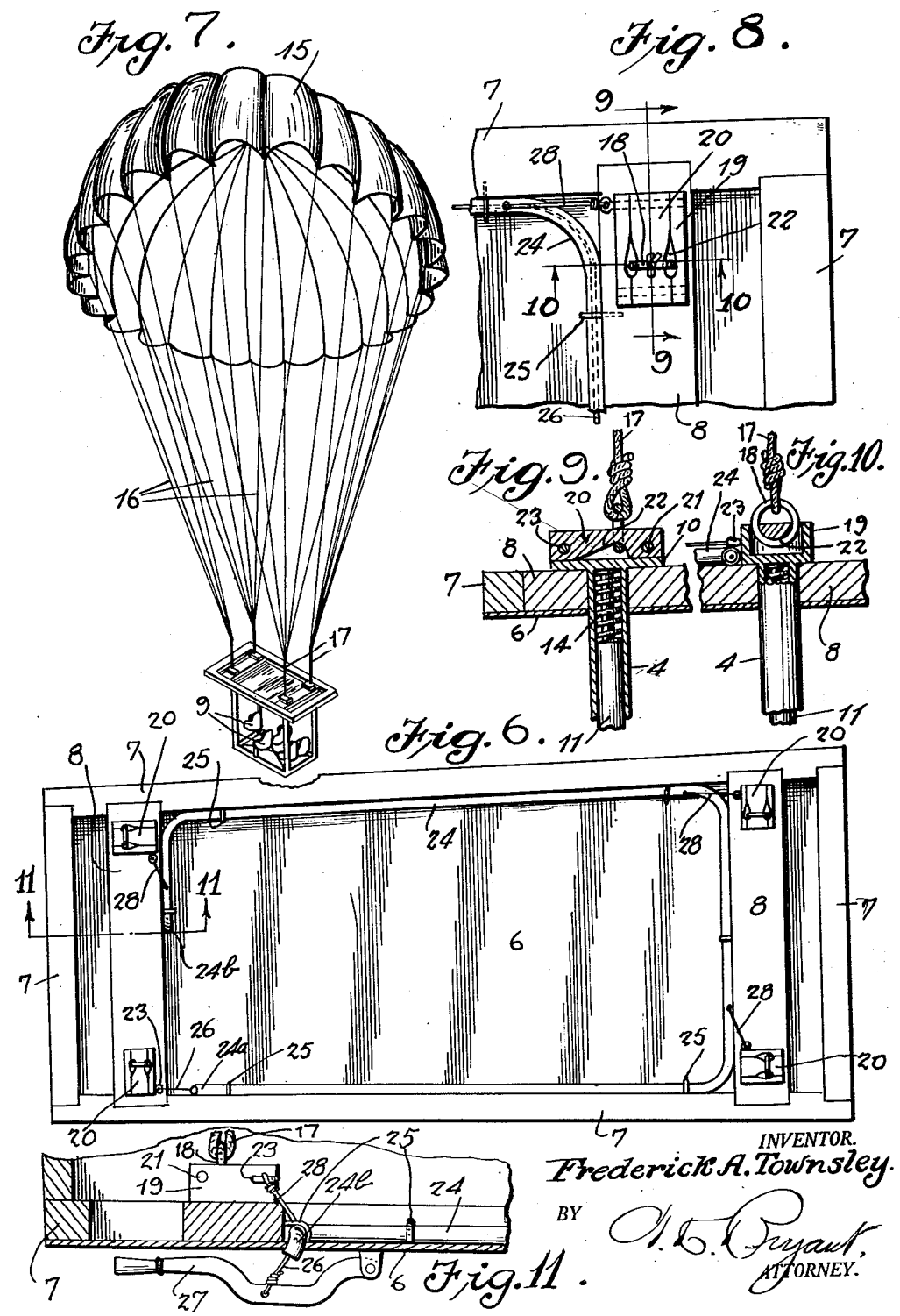

June 14, 1932.  F. A. TOWNSLEY  1,862,989
SAFETY APPLIANCE FOR AIRCRAFT
Original Filed April 10, 1929  4 Sheets-Sheet 4

INVENTOR.
Frederick A. Townsley.
BY
D. E. Bryant
ATTORNEY.

Patented June 14, 1932

1,862,989

UNITED STATES PATENT OFFICE

FREDERICK A. TOWNSLEY, OF ST. ALBANS, NEW YORK

SAFETY APPLIANCE FOR AIRCRAFT

Application filed April 10, 1929, Serial No. 353,988. Renewed November 3, 1931.

This invention relates to certain new and useful improvements in safety appliances for aircraft and has particular reference to a parachute attachment for a seat portion or carriage releasably secured to the aircraft and under the control of the pilot whereby the carriage and attached parachute are freed from the aircraft.

A further object of the invention is to provide a safety appliance of the above type in which the parachute may be disengaged from the pilot and passenger carriage when the latter descends to the ground to prevent the parachute from settling above the carriage and also to prevent the parachute from dragging the carriage along the ground line, thereby providing a safe and secure landing.

With the above and other objects in view that will become apparent as the nature of the invention is better understood, the same consists in the novel form, combination and arrangement of parts hereinafter more fully described, shown in the accompanying drawings and claimed.

In the drawings :—

Figure 3 is a cross-sectional view taken on line 3—3 of Figure 1 showing the parachute disposed above the pilot and passenger carriage that is detachable from the airplane, with the parachute confined by the latch releasable cover;

Figure 4 is a vertical longitudinal sectional view of the releasable cover section of the wing overlying the carriage recess in the airplane body;

Figure 5 is a fragmentary side elevational view, partly in section, similar to Figure 3, showing the pilot and passenger carriage in disengaged and separated position relative to the airplane;

Figure 6 is a top plan view of the pilot and passenger carriage;

Figure 7 is a perspective view of the pilot and passenger carriage and the parachute attached thereto during descent;

Figure 8 is an enlarged fragmentary top plan view of one corner of the pilot and passenger carriage showing the manually releasable latch device to which the parachute lanyards are connected;

Figure 12:
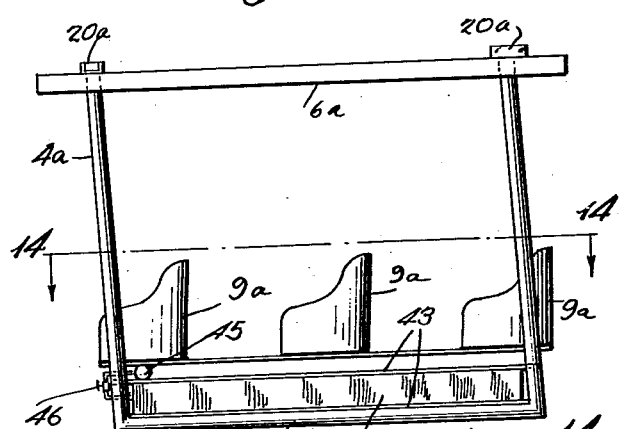
Figure 13:
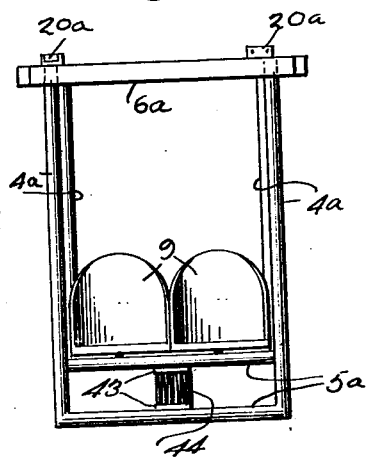
Figure 14:
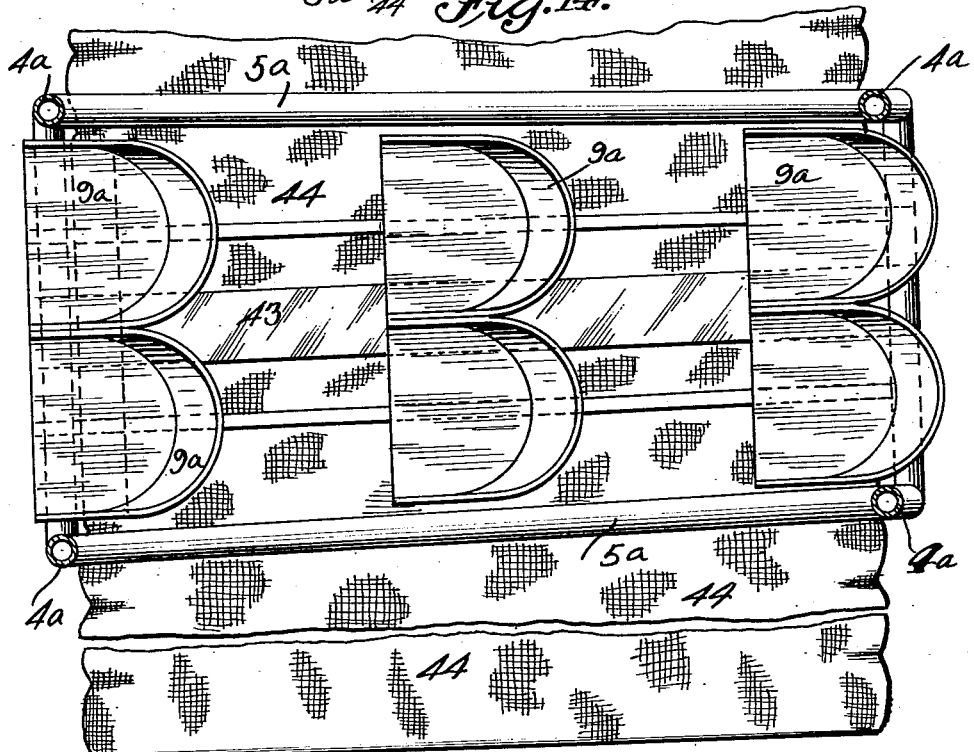
Figure 15:
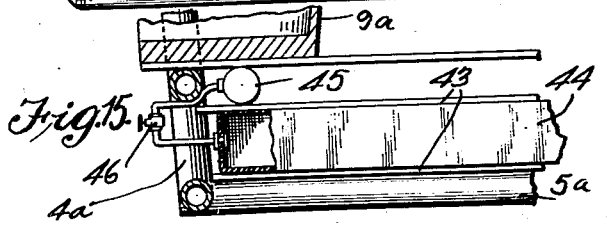

Figures 9 and 10 are detail sectional views taken on lines 9—9 and 10—10 of Figure 8, showing the retaining latch for the parachute lanyards;

Figure 11 is an enlarged detail sectional view taken on line 11—11 of Figure 6 showing the releasing mechanism for the parachute lanyards;

Figure 12 is a side elevational view of another form of pilot and passenger carriage wherein a float or life raft is carried by the floor section of the carriage to sustain the carriage should the same descend upon water;

Figure 13 is a front elevational view of the carriage shown in Figure 12 with the pontoon or life raft in its inoperative folded position;

Figure 14 is a horizontal sectional view taken on line 14—14 of Figure 12 showing the pontoon or life raft extended and inflated into operative position; and Figure 15 is a detail sectional view showing a compressed air tank carried by the carriage having valved communication with the flexible inflatable pontoon or life raft.

This invention relating to a safety appliance for aircraft has for its primary object to provide a pilot and passenger carriage releasably confined by the aircraft and having a parachute attached thereto in a manner to permit freeing of the parachute from the carriage when the latter reaches a landing position so that the parachute will not descend upon the carriage or be driven laterally and carry the carriage therewith. While the safety appliance may be associated with aircraft of various types, there is illustrated a fuselage 1 having a wing 2 extending laterally thereof, the forward portion of the fuselage 1 having a clearance space for a pilot and passenger carriage, the top wall of which, when confined in the fuselage lies substantially in the same plane as the lower side of the wing 2, the wing being cut away above the clearance space for the carriage to receive in said cut away portion, the detachable cover 3.

The pilot and passenger carriage comprises a rectangular skeleton framework formed of tubular corner posts 4 connected between their sides at the lower end by rods 5, while the upper ends of the tubular corner posts 4 are connected by the rectangular plate 6 bordered by a frame bar 7 with transverse bars 8 extending between the sides of the frame bar 7 adjacent the opposite ends thereof. The lower rods 5 are suitably cross-braced as diagrammatically illustrated in Figure 7, the carriage carrying a plurality of seats 9 for a pilot and passengers. The upper ends of the corner posts 4 extend through the cover plate 6 of the carriage as shown in Figures 9 and 10 and also through the transverse bars 8, the upper ends of the posts being closed and laterally flanged as at 10 to engage the upper side of the bar 8. The support for the carriage within the fuselage 1 includes a plurality of vertical rods 11 rigidly anchored to the bottom of the fuselage and reduced at their upper ends as at 12 to provide shoulders 13, the rods 11 being received in the tubular corner posts 4, while each corner post has anchored in its upper end as shown in Figs. 9 and 10, a coil spring 14 to surround the reduced upper end 12 of the rod 11 to engage the shoulder 13 of the rod so that when the carriage is released from the aircraft, the springs 14 will function initially to elevate or cause separating movement between the pilot and passenger carriage and the aircraft body, the rods 11 constituting guides for the carriage during its escape from the aircraft.

The parachute 15 is detachably connected to the carriage top or upper ends of the corner posts and in folded position as shown in Figure 3 is supported on the top plates 6 of the carriage and confined within the aircraft structure by the cover section 3 that closes the open upper side of the wing 2 as illustrated. The several lanyards 16 leading from the ends of the corner folds of the parachute 15 are equally distributed among four lead lines 17 that are looped at their ends to receive a ring 18. The flange 10 upon the upper end of each corner post 4 carries perpendicularly extending side walls 19 having a latch 20 pivoted between the side walls at one of its ends as at 21 and undercut as at 22 to provide a clearance for the lead line ring 18, the free swinging end of the latch 20 being retained in its lowered ring retaining position as shown in Figures 8 to 10 by the pin 23 passing through aligned apertures in the side walls 14 of the post head and the swinging end of the latch.

The releasing means for the latches 20 provides for simultaneous release of the several latches and includes a tubular guide 24 arranged adjacent the inner side of the side bars 7 of the rectangular frame that may be of any preferred design and the transverse bars 8 as shown in Figure 6 and there retained by the fastening devices 25. A cord 26 extends through the tubular guide 24, the end 24a of the guide being disposed above the top plate 6 of the carriage adjacent one of the corner posts and connected to the adjacent latch retaining pin 23, the other end of the cord 26 as shown in Figure 11 passing out of the other end 24b of the guide 24 below the top plate 6 of the carriage and attached to the operating handle 27. The lead cords 28 attached to the latch retaining pins 23 associated with the other three corner posts extend through adjacent openings formed in the tubular guide 24 for attachment to the cord 26 so that all of the latch pins 23 are simultaneously operated.

Figure 1:
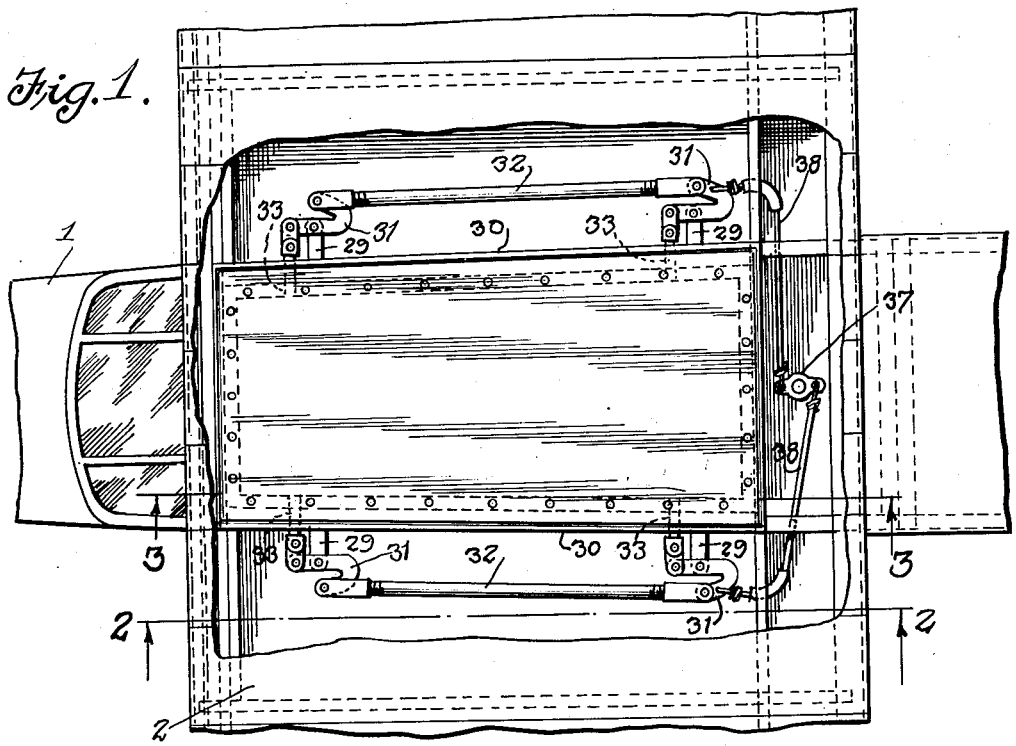
Figure 1 is a fragmentary top plan view of an airplane equipped with the safety appliance forming the subject matter of this application, parts of the wing structure being broken away to show the latch mechanism for holding the removable cover section for the carriage compartment of the airplane in position.
Figure 2:
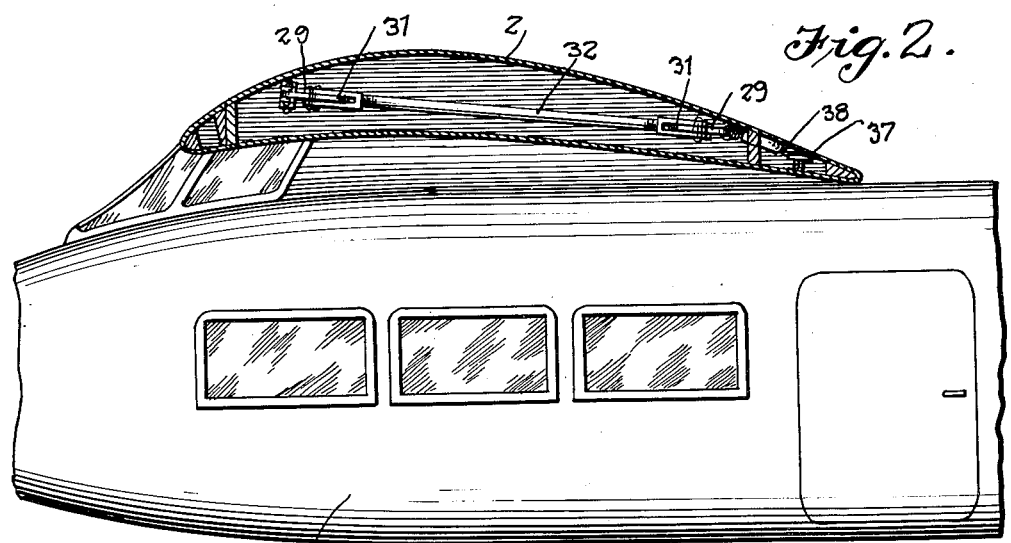
Figure 2 is a cross-sectional view taken on line 2—2 of Figure 1 showing a part of the latch mechanism housed within the wing structure.

The cover 3 for the pilot and passenger carriage while illustrated as forming a part of the wing structure, may also form a part of the fuselage and is releasably locked to the main portion of the wing by devices under control of the pilot, these devices being shown more clearly in Figures 1 to 3. A bracket arm 29 extends laterally from the wing bar 30 at each side of the wing opening through which the carriage passes and adjacent each corner of said opening as shown in Figure 1 for the support of a lever 31, the levers 31 at each side of the opening being connected by a link 32 for simultaneous operation. The other end of each lever 31 carries a latch bolt 33 projecting through the adjacent side bar 30 to be engaged with the apertured lug 34 upon the cover 3. A vertical post 35 journaled at its lower end in a frame bar in the fuselage 1 and supported adjacent its upper end by the brackets 36 extends into the rear end of the wing structure 2 and is provided upon its upper end within the wing structure with a cross arm 37 having link connections 38 with the adjacent levers 31 as shown in Figure 1. An arm 39 projecting laterally from the lower end of the rotatable post 35 has a cable connection 40 lying adjacent the bottom of the fuselage 1 with the operating lever 41 in proximity of the pilot's seat in the carriage. The cover 3 is interfittingly engaged with the wing structure 2 and has the usual wing fabric 3a projecting beyond the front and rear ends thereof to overlie the wing bars 2a to be set into a recess in the upper edge thereof to prevent the seepage of water and moisture through the connection between the cover and wing for protection of the parachute and mechanism.

When it is desired to use the parachute, should the aircraft become damaged during flight by fire or for any other reason become unmanageable and endanger the lives of the occupants, the lever 41 is first operated to rotate the post 35 for simultaneously operating the several levers 31 to release the bolts 33 from engagement with the cover 3 and at which time the cover will be removed from the wing or fuselage structure 2 upon upward movement of the carriage influenced by the springs 14 interposed between the tubular collar posts 4 of the carriage and the guide rods 11, the cover section 3 being discarded and exposing the parachute 15. To further increase the speed of discharge or separation of the carriage from the aircraft, telescoping cylinder sections 42 as shown in Figure 3 are carried by the lower end of the carriage in the bottom wall of the fuselage to contain an explosive substance that may be suitably ignited for the separation of the cylinder sections 42. The carriage may also be separated from the aircraft by supplying compressed air to the telescoping cylinder sections, or any other means of expulsion may be employed. The pilot and passenger carriage is then fully discharged from the aircraft, the parachute 15 opening during descent as shown in Figure 7, the carriage then slowly descending to the ground. When the carriage reaches the ground, the parachute is disengaged therefrom by operating the lever 27 for simultaneously releasing the several pins 23 which permits movement of the latches 20 upon the hinge mountings 21 so that the rings 18 carried by the lead lines 17 of the parachute lanyards are disengaged from the latches 20 whereupon the parachute will be immediately separated from the carriage with the latter safely landed with its occupants.

As shown in Figures 12 to 15, provision is made for sustaining the carriage upon the surface of water, the lower end of the carriage being provided with spaced connecting bars 5a extending between the frame of the carriage comprising the tubular corner posts, while a pair of longitudinally extending strip bars 43 located between the rods 5a normally confine a flexible bellows pontoon or life raft 44. A compressed air tank 45 carried by the carriage has a valve controlled flexible pipe connection 46 with the bellows pontoon 44 so that should the pilot and passenger carriage descend upon water, the pontoon may then be inflated to lie beneath and laterally of the carriage for sustaining the same on water.

While there are herein shown and described the preferred embodiments of the present invention, it is nevertheless to be understood that minor changes may be made therein without departing from the spirit and scope of the invention as claimed.

I claim:—

1. A safety appliance for aircraft comprising an aircraft body, a passenger carriage releasably retained in the body, a cover wall in the stream line of the body above the carriage, means for retaining and releasing the carriage and cover wall from the body, a parachute releasably attached to the carriage and normally confined by the cover wall, and means for releasing the parachute from the carriage.

2. A safety appliance for aircraft comprising an aircraft body, a passenger carriage releasably retained in the body, means for releasing the carriage from the body, a parachute releasably attached to the carriage, means for releasing the parachute from the carriage, vertical guide rods carried by the body, the carriage including tubular posts received on the rods, and compression springs interposed between the posts and rods to separate the body and carriage when the latter is released.

3. A safety appliance for aircraft comprising an aircraft body, a passenger carriage releasably retained in the body, means for releasing the carriage from the body, a parachute releasably attached to the carriage, means for releasing the parachute from the carriage, vertical guide rods carried by the body, the carriage including tubular posts received on the rods, compressing springs interposed between the posts and rods to separate the body and carriage when the latter is released, the releasing means for the parachute comprising pivoted latches, retaining pins for the latches, the lanyards of the parachute being attached to the latches, and means for releasing the latches.

4. A safety appliance for aircraft comprising an aircraft body, a passenger carriage releasably retained in the body, means for releasing the carriage from the body, a parachute releasably attached to the carriage, means for releasing the parachute from the carriage, the releasing means for the parachute comprising pivoted latches, retaining pins for the latches, the lanyards of the parachute being attached to the latches, a tubular guide on the carriage, a cord extending through the guide with branch connections to the latches, and a lever for operating the cord simultaneously to release the latches.

5. A safety appliance for aircraft comprising an aircraft body, a passenger carriage releasably retained in the body, means for releasing the carriage from the body, a parachute releasably attached to the carriage, means for releasing the parachute from the carriage, vertical guide rods carried by the body, the carriage including tubular posts received on the rods, compressing springs interposed between the posts and rods to separate the body and carriage when the latter is released, the releasing means for the parachute comprising pivoted latches, retaining pins for the latches, the lead lines of the parachute being attached to the latches, a tubular guide on the carriage, a cord extending through the guide with branch connections to the latches, and a lever for operating the cord simultaneously to release the latches.

6. A safety appliance for aircraft comprising an aircraft body, a passenger carriage releasably retained in the body, means for releasing the carriage from the body, a parachute releasably attached to the carriage, means for releasing the parachute from the carriage, vertical guide rods carried by the body, the carriage including tubular posts received on the rods, compressing springs interposed between the posts and rods to separate the body and carriage when the latter is released, and an inflatable pontoon on the carriage.

7. A safety appliance for aircraft comprising an aircraft body having a compartment therein open at the upper side of the body, a removable cover for the opening set into the stream line of the body, a passenger carriage in the compartment contained therein by the cover, a parachute releasably attached to the upper end of the carriage and means for releasing the cover to permit upward ejection of the carriage and parachute.

In testimony whereof I affix my signature.

FREDERICK A. TOWNSLEY.